United States Patent
Montanari et al.

(10) Patent No.: US 6,916,517 B2
(45) Date of Patent: Jul. 12, 2005

(54) POLYAMIDE-BASED TRANSPARENT COMPOSITION

(75) Inventors: Thibaut Montanari, Bernay (FR); Christelle Recoquille, Nassandres (FR)

(73) Assignee: Arkema, Puteaux (FR)

( * ) Notice: Subject to any disclaimer, the term of this patent is extended or adjusted under 35 U.S.C. 154(b) by 143 days.

(21) Appl. No.: 10/054,868

(22) Filed: Jan. 25, 2002

(65) Prior Publication Data

US 2002/0179888 A1 Dec. 5, 2002

(30) Foreign Application Priority Data

Jan. 26, 2001 (FR) .............................. 01 01110

(51) Int. Cl.$^7$ .................. C08L 77/00; C08L 77/12; B29D 23/00; A63C 5/00
(52) U.S. Cl. ............... 428/35.7; 428/32.39; 428/98; 428/474.4; 428/475.5; 428/195; 428/914; 525/432; 525/434; 280/601
(58) Field of Search .................. 525/432, 434; 428/35.7, 474.4, 475.5, 98, 32.39, 914, 195; 250/601

(56) References Cited

U.S. PATENT DOCUMENTS

| | | | |
|---|---|---|---|
| 4,404,317 A | | 9/1983 | Epstein et al. |
| 4,822,852 A | * | 4/1989 | Wittmann et al. ............ 525/66 |
| 5,266,655 A | | 11/1993 | Prevost et al. |
| 5,288,799 A | * | 2/1994 | Schmid et al. ................. 525/6 |
| 5,416,172 A | * | 5/1995 | Blondel et al. ............ 525/432 |
| 6,282,287 B1 | | 8/2001 | Montanari et al. |

FOREIGN PATENT DOCUMENTS

| | | |
|---|---|---|
| EP | 0 070 001 A | 1/1983 |
| EP | 0 408 474 A | 1/1991 |
| EP | 0 628 602 A1 | 12/1994 |
| WO | WO 97 46621 A | 12/1997 |

OTHER PUBLICATIONS

JP 60215054 A . . . Patenet Abstract Only.
JP 60215053 A . . . Patent Abstract Only.
JP 07145368 A . . . Patent Abstract Only.
JP 00287547 A . . . Patent Abstract Only.
Journal of Liquid Chromatography 11(16) 3305–3319 (1988).
Enplas, Booklet on Engineering Plastics, Sect. 2.1, pp. 12–13 Ed 1991 published by THe Japanese Engineering Association.

* cited by examiner

Primary Examiner—Ana Woodward
(74) Attorney, Agent, or Firm—Millen Zelano & Branigan, P.C.

(57) ABSTRACT

A composition comprising, by weight, the total being 100%:
  5 to 40% of an amorphous polyamide (B) which results from the condensation of at least one aromatic diacid and with at least one diamine said diamine being optionally cycloaliphatic, and, optionally with at least one monomer chosen from:
    α,ω-aminocarboxylic acids,
    aliphatic diacids,
    aliphatic diamines,
  0 to 40% of a supple polyamide (C) chosen from copolymers containing polyamide blocks, polyether blocks and copolyamides,
  0 to 20% of a compatibilizer (D) for (A) and (B),
  (C)+(D) is between 2% and 50%,
  with the condition that (B)+(C)+(D) is not less than 30%, and the difference to 100% is made up with a semi-crystalline polyamide (A). This composition can be molded into transparent sheets treated by a sublimation printing process at relatively low temperatures.

45 Claims, No Drawings

POLYAMIDE-BASED TRANSPARENT COMPOSITION

FIELD OF THE INVENTION

The present invention relates to a polyamide-based transparent composition. The present invention also relates to the articles obtained from this composition and to processes for preparing such articles. Polyamides are polymers that are widely used for their numerous properties. Specifically, polyamides have some or all of the properties listed below: transparency, impact strength, tensile strength and/or compressive strength, high resistance to external attack, such as by cold, heat, chemical agents, UV radiation in particular, and the like. Thus, polyamide-based articles such as, for example, spectacle frames, various types of casing, motor vehicle equipment, surgical equipment, packaging, sporting and ski articles, in particular a ski topsheet, have appeared. These articles should usually carry various inscriptions, for instance the characteristics of the product sold in the case of a packaging made of polyamide. These products should also often be decorated.

One example of a product which needs to be decorated is a ski, in particular the topsheet. It has thus naturally been sought to decorate the polyamides according to the techniques usually used and in particular that of sublimation. This technique, known as decoration by sublimation or heat transfer, consists in coating the article to be decorated with a layer of pigments at a temperature of between 80° C. and 220° C., and in heating the assembly to a given temperature. The pigments are said to be sublimable, but this technique is effective with pigments which can migrate into the structure of the polymer. In point of fact, a person skilled in the art understands this term "decoration by sublimation" without it being necessary to go into further detail here. The temperature to which the article to be decorated is brought should be high enough to bring about the sublimation or heat transfer of the pigments, which may then penetrate, by diffusion, into the structure of the polymer, if this polymer is of suitable morphology. Needless to say, the polymer should withstand the temperature used during the decoration by sublimation.

THE PRIOR ART AND THE TECHNICAL PROBLEM

The polyamides of the prior art do not always have the required properties to be decorated by sublimation. If the polyamide is crystalline or semi-crystalline, it withstands high temperatures and the often harsh conditions for carrying out decoration by sublimation may be used with this polyamide. However, crystalline or semi-crystalline polyamides are not transparent and their opacity makes them unsuitable for use when transparency is desired. If the polyamide is amorphous, it is thus transparent and, on account of this transparency, may be suitable in applications in which this transparency property is desired. However, when the temperature used for the sublimation is below the glass transition temperature, the polyamide does not have a sufficiently disorganized structure and the sublimable pigments diffuse into the polyamide bulk with difficulty. The resulting colour is pale and thus unsuitable for marketing. When the temperature used for the sublimation is higher than the glass transition temperature, the polyamide becomes unacceptably deformed and is thus unsuitable for the use for which it is normally intended.

Patents FR-A-2 575 756 and FR-A-2 606 416 disclose amorphous polyamide compositions based on BACM (bis (4-aminocyclohexyl)methane), BAMCM (bis(3-methyl-4-aminocyclohexyl)methane diamines, isophthalic or terephthalic acid, and other polyamides. These polyamides have transparency properties and are useful for manufacturing moulded articles. The said document describes a moulding temperature which may be as high as 310° C.

Patents JP-60-215 053 and 60-215 054 disclose and claim alloys comprising, on the one hand, a transparent polyamide and, on the other hand, a crystalline polyamide. The transparent polyamide consists of aliphatic units as essential monomer component, which are chosen from lauryllactam, 12-aminododecanoic acid and 11-aminoundecanoic acid, and cyclic units. The examples given for these transparent polyamides include, as cyclic units, a cycloaliphatic diamine, bis(4-aminocyclohexyl)methane and an aromatic diacid, isophthalic acid. The crystalline polyamide consists of Nylon-12 and/or Nylon-11, or of copolyamide having a 12 and/or 11 unit as essential monomer.

Patent FR-A-2 021 910 discloses polyamide compositions comprising from 40% to 99% by weight of an amorphous polyamide based on aromatic acids and 2,2,4- and/or 2,4, 4,-trimethylhexamethylenediamine and 60% to 1% by weight of an aliphatic polyamide. The articles obtained are transparent, show good rigidity and are impact- and water-resistant. The polyamides are used for the manufacture, by moulding, of hollow articles such as bottles. The temperatures used are conventional temperatures.

U.S. Pat. No. 4,404,317 discloses polyamide compositions such as 6,I/6,T/BACM, I/BACM, T which have properties that are useful for manufacturing articles. These polyamides are obtained by blending at a temperature of between 270° C. and 300° C. According to the said document, the blends have properties of resistance to solvents, heat stability and conservation of the mechanical properties under wet conditions. U.S. Pat. No. 4,404,317 discloses blending conditions, such as the temperature, for various polyamides; in particular, it is recommended not to exceed 300° C. on account of the degradation of the crystalline polyamide and also of the amorphous polyamide. It is also known that crystalline polyamides (including PA-12 or PA-6,12) have a degradation temperature of about 270° C., both for injection-moulding and for extrusion. This temperature may be raised for very brief periods or in the presence of a stabilizer to a temperature of about 300° C.

Patent EP 0 628 602 discloses blends of amorphous polyamide and of semi-crystalline polyamide. The examples were carried out on a Werner 30 twin-screw extruder equipped with a blender section, at a material temperature of 330 to 340° C., starting firstly with a semi-crystalline polyamide PA-11 with an inherent viscosity of 1.38 dl/g and secondly with an amorphous semi-aromatic polyamide PA-12/BMACM, T/BMACM, I. The latter polyamide is synthesized by melt-polycondensation starting with bis(3-methyl-4-aminocyclohexyl)methane (BMACM), lauryllactam (L12) and isophthalic and terephthalic acid (IA and TA) in a 1/1/0.3/0.7 molar ratio. This amorphous polyamide has a glass transition temperature of 170° C. and an inherent viscosity of 1.05 dl/g. The blends leaving the Werner extruder die are cooled in the form of rods in a tank filled with cold water, cut into granules and heated at 80° C. under vacuum for 12 hours so as to remove the moisture.

The prior art has disclosed either semi-crystalline polyamides or amorphous polyamides, or alternatively mixtures thereof. Semi-crystalline polyamides and amorphous polyamides are unsuitable for articles which need to be decorated by sublimation. As regards blends of semi-crystalline polyamides and of amorphous polyamide, the amorphous polyamide always contains aromatic units, generally isophthalic acid or terephthalic acid, which necessitates the use of high temperatures to blend them, resulting in a risk of degradation and a cost which is proportionately higher the higher the temperature.

A polyamide-based transparent composition has now been found which consists essentially of a blend of semi-crystalline polyamide, of an amorphous polyamide containing units which are aromatic diacid residues and of at least one product chosen from supple polyamides and compatibilizers for the semi-crystalline polyamide and for the amorphous polyamide. That is to say that, compared with the prior art in which the aliphatic polyamide and the amorphous polyamide can only be blended at high temperature, it has been found that, if a semi-crystalline polyamide, an amorphous polyamide containing units which are aromatic diacid residues and at least one product chosen from supple polyamides and compatibilizers for the semi-crystalline polyamide and for the amorphous polyamide are blended simultaneously, a transparent composition is obtained at a compounding temperature which is lower than in the prior art, and thus the products do not degrade. Another advantage is that the compositions are more supple while at the same time remaining transparent.

The present invention relates to a transparent composition comprising, by weight, the total being 100%:

5 to 40% of an amorphous polyamide (B) which results essentially from the condensation of at least one optionally cycloaliphatic diamine, of at least one aromatic diacid and optionally of at least one monomer chosen from:
α,ω-aminocarboxylic acids,
aliphatic diacids,
aliphatic diamines,
0 to 40% of a supple polyamide (C) chosen from copolymers containing polyamide blocks and polyether blocks and copolyamides,
0 to 20% of a compatibilizer (D) for (A) and (B),
(C)+(D) is between 2% and 50%,
with the condition that (B)+(C)+(D) is not less than 30%, the difference to 100% being a semi-crystalline polyamide (A).

The term "transparent" corresponds to a coefficient of light transmission of greater than or equal to 50%, measured at 560 nm and for a thickness of 2 mm. It is preferably ≧80%.

The term "polyamide" used in the present description also covers copolyamides, which may contain third monomers in a proportion which does not affect the essential qualities of the polyamides.

The term "semi-crystalline" covers (co)polyamides which have both a glass transition temperature Tg and a melting point m.p.

The term "amorphous" covers polyamides which change to the liquid or molten state, and thus which may be used, above their Tg. In principle, these polymers do not have an m.p. in DSC. However, they may have one, but, if they do, its intensity is negligible and does not affect the essentially amorphous nature of the polymer.

The definitions according to the present invention are in accordance with those commonly accepted in the art. Reference will be made advantageously to the publication "ENPLAs, Booklet on Engineering Plastics", section 2.1, pp. 12–13, Ed. 1991 published by "The Japan Engineering Association".

The composition of the invention has many advantages:

It is semi-crystalline like the polyamide (A), i.e. it can be decorated by sublimation. The crystalline structures are small enough for the composition to be transparent.

It is not too rigid like the semi-aromatic polyamides of the prior art. Its modulus of flexure may be between 1 400 and 600 MPa, the measurement being made on a sample conditioned for 15 days at 23° C. and 50% RH (relative humidity). Specifically, PA 11 has a modulus of flexure of 1 000 MPa, which is considered as average by comparison with a rigid polyamide with a modulus of flexure of 2 000 MPa and a supple polyamide with a modulus of flexure of 500 MPa.

It is ductile, has good impact strength and crack resistance, and also good abrasion resistance. An article such as a sheet will be suitable for the various shaping operations (cold moulding, swaging) which may be required to obtain a finished product such as a ski.

Furthermore, it has low moisture sensitivity, essentially since, for (A), the monomers used contain at least 9 carbon atoms, for example: PA11, PA12, PA10.12, coPA10/9.12. By virtue of the semi-crystalline nature of (A), it has good chemical resistance, good cracking stress resistance and good ageing resistance.

It is easy to manufacture since the temperature at which there is formation of a transparent material is lower than the compounding temperature (melt blending in an extruder or a mixer) of the semi-crystalline polyamide (A) and of the amorphous polyamide (B) in the absence of (D). The compounding temperature is proportionately lower the larger the amount of (D) in the composition.

The advantage of this lower temperature is that there is no degradation, the composition does not yellow, it has few problems or gels, if any, and the composition is easier to recycle (it may undergo a new use more easily).

It is very easily used, typically by extrusion. The properties of the molten material are adequate (sufficient viscosity) and stable (no fluctuation during the production of the article) and there are no fumes or deposits, unlike certain transparent polyamide compositions of the prior art.

The invention also relates to articles consisting of the composition of the invention, such as plates, films, sheets, tubes and profiles, to the articles obtained by injection-moulding and in particular to the films and sheets which are then bonded onto skis.

The invention also relates to the above articles decorated, for example, by sublimation, and coated with a transparent protective layer consisting of the composition of the invention.

DETAILED DESCRIPTION OF THE INVENTION

As regards the semi-crystalline polyamide (A), mention may be made (i) of aliphatic polyamides which are the products of condensation of an aliphatic α,ω-aminocarboxylic acid, of a lactam or the products of condensation of an aliphatic diamine and of an aliphatic diacid and (ii) other polyamides provided that they are semi-crystalline. Among these other semi-crystalline polyamides, the ones that are preferred are those which have crystalline structures that are small enough to be close to transparency; by way of example, mention may be made of the PA PACM-12 in which PACM denotes para-aminodicyclohexylmethane and 12 denotes the C 12 diacid.

By way of example of aliphatic α,ω-aminocarboxylic acids, mention may be made of aminocaproic acid, 7-aminoheptanoic acid, 11-aminoundecanoic acid and 12-aminododecanoic acid. As examples of lactams, mention may be made of caprolactam, oenantholactam and lauryllactam. As examples of aliphatic diamines, mention may be made of hexamethylenediamine, dodecamethylenediamine and trimethylhexamethylenediamine. As examples of aliphatic diacids, mention may be made of adipic acid, azelaic acid, suberic acid, sebacic acid and dodecanedicarboxylic acid.

Among the aliphatic polyamides, mention may be made, by way of example and in a non-limiting manner, of the following polyamides: polycaprolactam (PA-6); polyundecanamide (PA11); polylauryllactam (PA-12); polybutyleneadipamide (PA-4,6); polyhexamethyleneadipamide (PA-6,6); polyhexamethyleneazelamide (PA-6,9); polyhexamethylenesebacamide (PA-6,10); polyhexamethylenedodecanamide (PA-6,12); polydecamethylenedodecanamide (PA-10,12); polydecamethylenesebacanamide (PA-10,10) and polydodecamethylenedodecanamide (PA-12,12).

Advantageously, (A) is derived from the condensation of a lactam containing at least 9 carbon atoms, of an α,ω-aminocarboxylic acid containing at least 9 carbon atoms or of a diamine and a diacid such that the diamine or the diacid contains at least 9 carbon atoms. Advantageously, (A) is PA 11 or PA 12 and preferably PA 12. It would not constitute a departure from the context of the invention if (A) was a blend of aliphatic polyamides.

According to another advantageous form, (A) is an equilibrated polyamide. The names of the polyamides are recalled below according to their end groups.

According to their process of manufacture and/or the chain limiter used, the polyamides may have excesses of acid or amine end groups or may even have a proportion of alkyl or other end groups, for example aryl or any other function, deriving from the structure of the limiter chosen. The excess of acid end groups derives from a diacid chain limiter. The excess of amine end groups derives from a diamine chain limiter. A primary amine chain limiter leads to a polyamide chain having an alkyl end group and an amine end group.

The name diamine polyamide, PAdiNH$_2$, refers to a polyamide which satisfies the following criteria:

it has a certain amount of chains ending on both sides with an amine group (NH$_2$)

the amount of chains ending on both sides with an amine group (NH$_2$) is greater than that of the diacid chains (if any)

the concentration of amine groups is greater overall than the concentration of acid groups a PAdiNH$_2$ is obtained by adding a diamine as chain limiter or, in the case of polyamides based on diamine and on diacid such as, for example, PA6-6, by adding more diamine comonomer than diacid comonomer.

These polyamides are thus also known for simplicity as PA diamine or PAdiNH$_2$.

A polyamide is referred to as a diacid for the opposite reasons.

A polyamide is equilibrated if a limiter or an excess of one of the comonomers has not been added if the concentration of amine and of acid is essentially equivalent.

To determine the nature of the end groups of a polyamide and the percentage of chains having these end groups, it is possible to use the known methods for determining the molar masses, such as, for example, SEC (steric exclusion chromatography) and the methods for assaying amine and acid functions. In the present application, the term SEC denotes the measurement of the molecular masses of polymers by steric exclusion chromatography, this technique and more particularly its application to polyamides and polyamide block polyethers being disclosed in "Journal of Liquid Chromatography, 11(16), 3305–3319 (1988)". As regards the determination of the end groups, for example for PA 6, the sample is dissolved in a solution of phenol in methanol and the amines are titrated with a solution of para-toluenesulphonic acid in methanol. For the acid end groups, again for PA 6, the sample is dissolved in benzyl alcohol and the acid functions are titrated with a solution of potassium hydroxide in benzyl alcohol.

As regards the amorphous polyamide (B), it results essentially from the condensation of at least one optionally cycloaliphatic diamine and of at least one aromatic diacid. Examples of aliphatic diamines have been given above; the cycloaliphatic diamines may be isomers of bis(4-aminocyclohexyl)methane (BACM), bis(3-methyl-4-aminocyclohexyl)methane (BMACM) and 2-2-bis(3-methyl-4-aminocyclohexyl)propane (BMACP). The other diamines commonly used may be isophorone diamine (IPDA) and 2,6-bis(aminomethyl)norbornane (BAMN). Examples of aromatic diacids which may be mentioned are terephthalic acid (T) and isophthalic acid (I).

The amorphous polyamide (B) may optionally contain at least one monomer chosen from:

α,ω-aminocarboxylic acids, aliphatic diacids, aliphatic diamines, these products have been described above.

Examples of (B) which may be mentioned are the amorphous semi-aromatic polyamide PA-12/BMACM, TA/BMACM, IA synthesized by melt polycondensation using bis(3-methyl-4-aminocyclohexyl)methane (BMACM), lauryllactam (L12) and isophthalic acid and terephthalic acid (IA and TA). It would not constitute a departure from the context of the invention if (B) was a mixture of several amorphous polyamides.

As regards the supple polyamide (C) and first the copolymers containing polyamide blocks and polyether blocks, these result from the copolycondensation of polyamide blocks containing reactive end groups with polyether blocks containing reactive end groups, such as, inter alia:

1) Polyamide blocks containing diamine chain ends with polyoxyalkylene blocks containing dicarboxylic chain ends.

2) Polyamide blocks containing dicarboxylic chain ends with polyoxyalkylene blocks containing diamine chain ends obtained by cyanoethylation and hydrogenation of aliphatic dihydroxylated alpha-omega polyoxyalkylene blocks known as polyether diols.

3) Polyamide blocks containing dicarboxylic chain ends with polyether diols, the products obtained in this particular case being polyetherester-amides. The copolymers (C) are advantageously of this type.

The polyamide blocks containing dicarboxylic chain ends are derived, for example, from the condensation of α,ω-aminocarboxylic acids, lactams or dicarboxylic acids and diamines in the presence of a chain-limiting dicarboxylic acid.

The number-average molar mass $\overline{M_n}$ of the polyamide blocks is between 300 and 15 000 and preferably between 600 and 5 000. The mass $\overline{M_n}$ of the polyether sequences is between 100 and 6 000 and preferably between 200 and 3 000.

The polymers containing polyamide blocks and polyether blocks may also comprise randomly distributed units. These polymers may be prepared by the simultaneous reaction of the polyether and the polyamide-block precursors.

For example, polyetherdiol, a lactam (or an α,ω-amino acid) and a chain-limiting diacid may be reacted in the presence of a small amount of water. A polymer is obtained essentially containing polyether blocks, polyamide blocks of very variable length, and also the various reagents which have reacted randomly and which are distributed randomly along the polymer chain.

Whether these polymers containing polyamide blocks and polyether blocks are derived from the copolycondensation of polyamide and polyether blocks prepared beforehand or from a one-pot reaction, they have, for example, Shore D hardnesses which may be between 20 and 75 and advantageously between 30 and 70 and an intrinsic viscosity of between 0.8 and 2.5 measured in meta-cresol at 250° C. for an initial concentration of 0.8 g/100 ml. The MFIs may be between 5 and 50 (235° C. for a 1 kg load).

The polyetherdiol blocks are either used without modification and are copolycondensed with polyamide blocks containing carboxylic end groups, or they are aminated in order to be converted into polyetherdiamines and condensed with polyamide blocks containing carboxylic end groups. They may also be blended with polyamide precursors and a chain limiter to make polymers containing polyamide blocks and polyether blocks with randomly distributed units.

Polymers containing polyamide blocks and polyether blocks are disclosed in patents U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

Three types of copolymer containing polyamide blocks and polyether blocks may be distinguished. According to a first type, the polyamide blocks containing dicarboxylic chain ends are derived, for example, from the condensation of α,ω-aminocarboxylic acids, of lactams or of dicarboxylic acids and diamines in the presence of a chain-limiting dicarboxylic acid. As an example of an α,ω-aminocarboxylic acid, mention may be made of aminoundecanoic acid, as examples of lactams, mention may be made of caprolactam and lauryllactam, as examples of dicarboxylic acids, mention may be made of adipic acid, decanedioic acid and dodecanedioic acid, and as an example of a diamine, mention may be made of hexamethylenediamine. Advantageously, the polyamide blocks are made of polyamide 12 or of polyamide 6.

According to a second type, the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms, and are of low mass, i.e. they have an $\overline{M_n}$ of from 400 to 1 000. As examples of α,ω-aminocarboxylic acids, mention may be made of aminoundecanoic acid and aminododecanoic acid. As examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH. Examples of lactams which may be mentioned are caprolactam and lauryllactam. Polyamide blocks obtained by condensation of lauryllactam in the presence of adipic acid or dodecanedioic acid and with an $\overline{M_n}$ of 750 have a melting point of 127–130° C.

According to a third type, the polyamide blocks result from the condensation of at least one α,ω-aminocarboxylic acid (or a lactam), at least one diamine and at least one dicarboxylic acid. The α,ω-aminocarboxylic acid, the lactam and the dicarboxylic acid may be chosen from those mentioned above. The diamine may be an aliphatic diamine containing from 6 to 12 atoms and may be arylic and/or saturated cyclic. Examples which may be mentioned are hexamethylenediamine, piperazine, 1-aminoethylpiperazine, bisaminopropylpiperazine, tetramethylenediamine, octa-methylenediamine, decamethylenediamine, dodecamethylene-diamine, 1,5-diaminohexane, 2,2,4-trimethyl-1,6-diamino-hexane, diamine polyols, isophoronediamine (IPD), methylpentamethylenediamine (MPDM), bis(aminocyclohexyl)-methane (BACM) and bis(3-methyl-4-aminocyclohexyl)methane (BMACM).

In the second and third types, the various constituents of the polyamide block and their proportion are chosen in order to obtain a melting point of less than 150° C. and advantageously between 90° C. and 135° C.

Copolyamides with a low melting point are disclosed in U.S. Pat. No. 4,483,975, DE 3,730,504 and U.S. Pat. No. 5,459,230, and the same proportions of the constituents are adopted for the polyamide blocks.

The polyether blocks may represent 5% to 85% by weight of the copolymer containing polyamide and polyether blocks. The polyether blocks may contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and PTMG blocks, i.e. those consisting of tetramethylene glycol units, also known as polytetrahydrofuran. PPG or PTMG blocks are advantageously used. The amount of polyether blocks in these copolymers containing polyamide and polyether blocks is advantageously from 10% to 50% by weight of the copolymer and preferably from 35% to 50%.

The copolymers containing polyamide blocks and polyether blocks may be prepared by any means for attaching the polyamide blocks and the polyether blocks. In practice, two processes are essentially used, one being a 2-step process, the other a one-step process.

The 2-step process consists firstly in preparing polyamide blocks containing carboxylic end groups by condensation of the polyamide precursors in the presence of a chain-limiting dicarboxylic acid and then, in a second step, in adding the polyether and a catalyst.

Once the polyamide containing carboxylic acid end groups has been prepared, the polyether and a catalyst are then added. The polyether may be added in one or more portions, as may the catalyst.

The catalyst is defined as being any product which facilitates the bonding of the polyamide blocks and the polyether blocks by esterification. The catalyst is advantageously a derivative of a metal (M) chosen from the group formed by titanium, zirconium and hafnium.

This process and these catalysts are disclosed in patents U.S. Pat. No. 4,332,920, U.S. Pat. No. 4,230,838, U.S. Pat. No. 4,331,786, U.S. Pat. No. 4,252,920, JP 07145368A, JP 06287547A and EP 613919.

As regards the one-step process, all the reagents used in the two-step process, i.e. the polyamide precursors, the chain-limiting dicarboxylic acid, the polyether and the catalyst, are blended. These are the same reagents and the same catalyst as in the two-step process disclosed above. If the polyamide precursors are only lactams, it is advantageous to add a small amount of water.

The copolymer essentially has the same polyether blocks and the same polyamide blocks, but also a small portion of different reagents which have reacted randomly and which are distributed randomly along the polymer chain.

Advantageously, (C) will be chosen such that it makes it possible "as a bonus" to use a smaller amount of (B) to obtain a transparent composition.

As regards the supple polyamide (C) consisting of copolyamide, this results either from the condensation of at least one α,ω-aminocarboxylic acid (or a lactam), at least one diamine and at least one dicarboxylic acid, or from the condensation of at least two α,ω-aminocarboxylic acids (or their possible corresponding lactams or of a lactam and of the other in α,ω-aminocarboxylic acid form). These constituents have already been defined above.

As examples of copolyamides, mention may be made of copolymers of caprolactam and of lauryllactam (PA 6/12), copolymers of caprolactam, of adipic acid and of hexamethylenediamine (PA 6/6-6), copolymers of caprolactam, of lauryllactam, of adipic acid and of hexamethylenediamine (PA 6/12/6-6), copolymers of caprolactam, of lauryllactam, of 11-aminoundecanoic acid, of azelaic acid and of hexamethylenediamine (PA 6/6-9/11/12), copolymers of caprolactam, of lauryllactam, of 11-aminoundecanoic acid, of adipic acid and of hexamethylenediamine (PA 6/6-6/11/12), copolymers of lauryllactam, of azelaic acid and of hexamethylenediamine (PA 6-9/12). The preferred copolyamides are copolyamides with a pronounced copolymeric nature, i.e. with essentially equivalent proportions of the various comonomers, which leads to properties that are the furthest removed from the corresponding polyamide homopolymers. It would not constitute a departure from the context of the invention if (C) was a blend of several copolymers containing polyamide blocks and polyether blocks or of several copolyamides or any combination of these possibilities.

As regards the compatibilizer (D) of (A) and (B), this is any product which reduces the temperature required to make the blend of (A) and (B) transparent. It is advantageously a polyamide. For example, if (A) is PA 12, then (D) is PA 11. Preferably, it is a catalysed aliphatic polyamide.

As regards the catalysed polyamide (D), this is a polyamide as described above for (A), but containing a polycondensation catalyst such as a mineral or organic acid, for example phosphoric acid. The catalyst may be added to the polyamide (D) after it has been prepared, by any process or, quite simply, and preferably, it may be the rest of the catalyst used for its preparation. The term "catalyzed polyamide" means that the chemistry continues beyond the steps for synthesis of the base resin and thus during the subsequent steps of the preparation of the compositions of the invention. Polymerization and/or depolymerization reactions may take place very substantially during the blending of the polyamides (A) and (B) and (D) to prepare the compositions of the present invention. Typically, the Applicant believes (without being bound by this explanation) that the chains continue to polymerize (chain extension) and to be branched (for example bridging by means of phosphoric acid). Furthermore, this may be considered as a tendency towards re-equilibrating the polymerization equilibrium, and thus a kind of homogenization. However, it is recommended to dry the polyamides thoroughly (and advantageously to control the moisture levels carefully) in order to avoid depolymerizations. The amount of catalyst may be between 5 ppm and 15 000 ppm of phosphoric acid relative to the resin (D). For other catalysts, for example boric acid, the contents will be different and may be chosen appropriately according to the usual techniques for the polycondensation of polyamides.

Advantageously, the proportion of (B) is between 10% and 40% and preferably between 20% and 40%. Advantageously, the proportion of (C)+(D) is between 5% and 40% and preferably between 10% and 40%.

The compositions of the invention are manufactured by melt-blending the various constituents (twin-screw, BUSS® or single-screw extruders) according to the usual techniques of thermoplastics. The compositions may be granulated for the purpose of a subsequent use (it suffices to remelt them) or they may be injected directly into an extrusion or co-extrusion mould or device to manufacture tubes, plates, films or profiles. A person skilled in the art may readily adjust the compounding temperature to obtain a transparent material; as a general rule, it suffices to increase the compounding temperature, for example to about 280 or 290° C.

The compositions of the invention may comprise stabilizers, antioxidants or UV stabilizers.

EXAMPLES

The following products were used:

ASAP: amorphous semi-aromatic polyamide PA-12/BMACM, TA/BMACM, IA synthesized by melt-polycondensation using bis(3-methyl-4-aminocyclohexyl)methane (BMACM), lauryl-lactam (L12) and isophthalic and terephthalic acid (IA and TA) in a 1/1/0.3/0.7 molar ratio.

PA 11: polyamide 11 with an $\overline{Mw}$ of 45 000 to 55 000.

PA 11 cata: a polyamide 11 with an $\overline{Mw}$ of 45 000 to 55 000 and containing 3 700 ppm of phosphoric acid catalyst.

PEBA 12: a copolymer containing PA 12 blocks with an $\overline{Mn}$ of 4 000 and PTMG blocks with an $\overline{Mn}$ of 1 000 and with an MFI of 4 to 10 (g/10 min at 235° C. under 1 kg).

PEBA 6: a copolymer containing PA 6 blocks with an $\overline{Mn}$ of 1 350 and PTMG blocks with an $\overline{Mn}$ of 650 and with an MFI of 3 to 10 (g/10 min at 235° C. under 1 kg).

PA 12: a polyamide 12 with an $\overline{Mw}$ of 45 000 to 55 000.

The results are reported in Table 1 below. The crystallinity is expressed by the heat of fusion divided by a constant. The modulus of flexure is measured on a sample conditioned for two weeks at 23° C. and 50% RH (relative humidity). In the "examples" column, the number followed by "C" means that it is a comparative example.

The preceding example can be repeated with similar success by substituting the generically or specifically described reactants and/or operating conditions of this invention for those used in the preceding example. Also, the preceding specific embodiments are to be construed as merely illustrative, and not limitative of the remainder of the disclosure in any way whatsoever.

The entire disclosure of all applications, patents and publications, and of corresponding French application 0101110, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

TABLE 1

| Examples | (A) Semi-crystalline PA | (B) Amorphous PA ASAP | (C) Supple polyamide | (D) Compatibilizer | Light transmission | Compounding temperature | m.p. | Cristallinity | Modulus of flexure |
|---|---|---|---|---|---|---|---|---|---|
| 1 c | PA11 | | | | <50% | | 189 | 22% | 1100 |
| 2 c | PA11 | 30% | | | >80% | 320 | | | 1350 |
| 3 | PA11 | 30% | 20% PEBA12 | | >80% | 320 | | | 1050 |
| 4 | PA11 | 25% | 15% PEBA12 | | >80% | 320 | | | 1100 |
| 5 c | PA12 | | | | <50% | | 178 | 24% | 1200 |
| 6 c | PA12 | 30% | | | >80% | 350 | 175 | | 1400 |
| 7 c | PA12 | 30% | | | <30% | 320 | | | |
| 8 | PA12 | 30% | | 10% PA11 | >80% | 335 | | | 1350 |
| 9 | PA12 | 30% | | 10% PA11cata | >80% | 320 | | | 1350 |
| 10 | PA12 | 15% | 15% PEBA6 | 10% PA11cata | >80% | 320 | | | 800 |
| 11 c | PA12 | 15% | | 10% PA11cata | <75% | | | | |
| 12 | PA12 | 25% | | 24% PA11cata | >80% | 320 | | | 1200 |
| 13 | PA12 | 15% | 10% PEBA6 | 24% PA11cata | >80% | 320 | | | 850 |

What is claimed is:

1. A composition comprising, by weight, the total being 100%:
   a semi-crystalline polyamide (A)
   5 to 40% of an amorphous polyamide (B) which results from the condensation of at least one aromatic diacid with at least one diamine, said diamine being optionally cycloaliphatic, and, optionally with at least one monomer which is:
      an α,ω-aminocarboxylic acid,
      an aliphatic diacid, or
      additional aliphatic diamines,
   0 to 40% of an additional polyamide (C) which is a copolymer containing polyamide blocks and polyether blocks,
   0 to 20% of a compatibilizer (D) for (A) and (B), which compatibilizer is a catalyzed polyamide, with the provisions that
   (C)+(D) is between 2% and 50%, and that (B)+(C)+(D) is not less than 30%.

2. The composition according to claim 1, wherein (A) is derived from the condensation of a lactam containing at least 9 carbon atoms, of an α,ω-aminocarboxylic acid containing at least 9 carbon atoms or of a diamine and a diacid wherein the diamine or the diacid contains at least 9 carbon atoms.

3. The composition according to claim 1, wherein (A) is derived from the condensation of caprolactam, oenantholactam or lauryllactam.

4. The composition according to claim 1, wherein (A) comprises PA-11 or PA-12.

5. The composition according to claim 1, wherein (A) comprises an equilibrated polyamide.

6. The composition according to claim 1, wherein the amorphous polyamide (B) comprises a cycloaliphatic diamine.

7. The composition according to claim 1, comprising (C), the copolymer comprising polyamide blocks and polyether blocks.

8. The composition according to claim 7, wherein polyamide blocks are PA-6 or PA-12 blocks and the polyether blocks are polytetramethylene glycol (PTMG) blocks.

9. The composition according to claim 6, comprising (D).

10. The composition according to claim 1, wherein PA-12 and comprising (D) wherein (D) is PA-11.

11. The composition according to claim 1, comprising(D).

12. The composition according to claim 1, wherein the proportion of(B) is between 10% and 40%.

13. The composition according to claim 12, wherein the proportion of(B) is between 20% and 40%.

14. The composition according to claim 1, wherein the proportion of(C)+(D) is between 5% and 40%.

15. The composition according to claim 14, wherein the proportion of(C)+(D) is between 10% and 40%.

16. A transparent article produced by injection-molding a composition according to claim 1.

17. The article according to claim 16, decorated by sublimation and coated with a transparent protective layer.

18. The composition according to claim 1, wherein the amorphous polyamide (B) comprises at least one monomer chosen from: α,ω-aminocarboxylic acids, aliphatic diacids, and aliphatic diamines.

19. The composition according to claim 1, in the form of an article having a modulus of flexure between 600 and 1400 Mpa.

20. The composition according to claim 1, wherein the semi-crystalline polyamide (A) comprises monomers containing at least 9 carbon atoms.

21. The composition of claim 20, wherein the semi-crystalline polyamide (A) comprises at least one of: PA11, PA12, PA10.12, and coPA10/9.12.

22. An article comprising the composition according to claim 1.

23. The article according to claim 22 selected from a plate, a film, a sheet, a tube or a profile.

24. The article according to claim 23, wherein said sheet or film is bonded onto a ski.

25. The article according to claim 24, wherein said article is decorated by sublimation and coated with a transparent protective layer comprising said composition.

26. A transparent article according to claim 22 produced by extrusion.

27. The composition according to claim 1, wherein (B) is condensed from monomers comprising said at least one monomers said monomer being selected from the group consisting of aminocaproic acid, 7-aminoheptanoic acid, 11-aminoundecanoic acid, and 12-aminododecanoic acid.

28. The composition according to claim 1, wherein (B) is condensed from monomers comprising said at least one monomer, said monomer being selected from the group consisting of hexamethylenediamine, dodecamethylenediamine, and trimethylhexamethylenediamine.

29. The composition according to claim 1, wherein (B) is condensed from monomers comprising said at least one monomer, said monomer being adipic acid, azelaic acid, suberic acid, sebacic acid, or dodecanedicarboxylic acid.

30. The composition according to claim 1, wherein said semi-crystalline polyamide (A) is an aliphatic polyamide selected from: polycaprolactam (PA-6), polyundecanamide (PA-11), polyauryllactam (PA-12), polybutylenedipamide (PA-4,6), polyhexamethylenedipamide (PA-6,6), polyhexamethyleneazelamide (PA-6,9), polyhexamethylenesebacamide (PA-6,10), polyhexamethylenedodecanamade (PA-6,12), polydecamethylenedodecanamide (PA-10,12), polydecamethylenesebacanamide (PA-10,10), and polydodexamethylenedodecanamide (PA-12,12).

31. The composition according to claim 30, wherein said (A) comprises a blend of aliphatic polyamides.

32. The composition according to claim 1, comprising said optional cycloaliphatic diamine and wherein said cycloaliphatic diamine comprises at least one isomer of: bis(4-aminocyclohexyl)methane (BACM), bis(3-methyl-4-aminocyclohexyl)methane (BACM) or 2-2-bis(3-methyl-4-minocyclohexyl)propane(BMACP).

33. The composition according to claim 1, wherein said aromatic diacid comprises terephthalic acid or isophthalic acid.

34. The composition according to claim 1, wherein said amorphous polyamide (B) comprises a mixture of several amorphous polyamides.

35. The composition according to claim 1, wherein said polyamide (C) comprises polyamide blocks having a number-average molar mass between 300 and 15,000.

36. The composition according to claim 1, wherein said polyamide (C) comprises polyether blocks having a number-average molar mass between 100 and 6,000.

37. The composition according to claim 1, comprising said compatibilizer (D) in a sufficient amount to allow a reduction in the temperature required to make the blend of (A) and (B) transparent.

38. The composition according to claim 37, wherein said compatibilizer (D) is a catalyzed aliphatic polyamide.

39. The composition according to claim 1 prepared by melt-blending.

40. The composition according to claim 1 comprising at least one of a stabilizer, an antioxidant or a UV stabilizer.

41. The composition according to claim 1, wherein (A) comprises PA-11 or, PA-12 or an equilibrated polyamide; (B) comprises said condensation products wherein said aromatic diacid comprises at least one of terephthalic acid (TA) and isophthalic acid (IA); and (D) comprises catalyzed PA-11, or a mixture of PA-11 and a catalyzed PA.

42. The composition according to claim 41, wherein (D) comprises a catalyzed PA-11.

43. The composition according to claim 1, wherein said (A) comprises PA-12; (B) comprises amorphous semi-aromatic polyamide PA-12/BMACM; TA/DMACM, IA synthesized by melt-condensation of bis(3-methyl-4-aminocyclohexyl)methane (BMACM), lauryl-lactam (L12) and isophthalic and terephthalic acids (IA and TA) in a 1/1/0.3/0.7 molar ratio; and (D) comprises a catalyzed PA-11 containing phosphoric acid catalysts.

44. A composition comprising, by weight, the total being 100%:
    a semi-crystalline polyamide (A) produced from monomers having at least 9 carbon atoms,
    10 to 40% of an amorphous polyamide (B) which results from the condensation of at least one aromatic diacid with at least one diamine, said diamine being optionally cycloaliphatic, and, optionally, with at least one monomer which is:
    an α,ω-aminocarboxylic acid,
    an aliphatic diacid, or
    additional aliphatic diamines,
    0 to 40% of an additional polyamide (C) which is a copolymer containing polyamide blocks and polyether blocks,
    0 to 20% of a compatibilizer (D) for (A) and (B), which compatibilizer is a catalyzed polyamide, with the provisions that
    (C)+(D) is between 5% and 40%, and that (B)+(C)+(D) is not less than 30%,
    said composition being in the form of an article having a modulus of flexure of 600 to 1400 Mpa.

45. The composition according to claim 44, wherein (A) is derived from the condensation of a lactam containing at least 9 carbon atoms, of an α,ω-aminocarboxylic acid containing at least 9 carbon atoms or of a diamine and a diacid wherein the diamine or the diacid contains at least 9 carbon atoms.

* * * * *

UNITED STATES PATENT AND TRADEMARK OFFICE
CERTIFICATE OF CORRECTION

PATENT NO. : 6,916,517 B2
DATED : July 12, 2005
INVENTOR(S) : Thibaut Montanari et al.

It is certified that error appears in the above-identified patent and that said Letters Patent is hereby corrected as shown below:

Column 11,
Line 63, "wherein PA-12" should read -- wherein (A) is PA-12 --.

Column 12,
Line 55, "monomers" should read -- monomer --.

Column 13,
Line 7, "polyhexamethylenedodecanamade" should read
-- polyhexamethylenedodecanamide --.

Signed and Sealed this

Eighth Day of November, 2005

JON W. DUDAS
*Director of the United States Patent and Trademark Office*